United States Patent
Moinard et al.

[11] Patent Number: 5,487,452
[45] Date of Patent: Jan. 30, 1996

[54] REVOLVING PLATE CLAMPING DEVICE

[75] Inventors: Patrice Moinard, Montreuil; Alain Thioux, Bry sur Marne; Jean Claude Mery, Pavillons Sous Bois, all of France

[73] Assignee: Bendix Europe Services Techniques, Drancy, France

[21] Appl. No.: 50,171
[22] PCT Filed: Mar. 10, 1993
[86] PCT No.: PCT/FR93/00233
 § 371 Date: May 6, 1993
 § 102(e) Date: May 6, 1993
[87] PCT Pub. No.: WO93/21455
 PCT Pub. Date: Oct. 28, 1993

[30] Foreign Application Priority Data
 Apr. 9, 1992 [FR] France .................. 92 04336

[51] Int. Cl.⁶ .................................. F16D 55/08
[52] U.S. Cl. ........................ 188/72.7; 188/72.6
[58] Field of Search .................. 188/72.7, 72.6, 188/71.3, 71.4, 72.9

[56] References Cited

U.S. PATENT DOCUMENTS

| | | | |
|---|---|---|---|
| 3,701,400 | 10/1972 | Burnett et al. | 188/72.6 |
| 4,422,600 | 12/1983 | Preston | 188/72.7 X |
| 4,550,810 | 11/1985 | Price et al. | 188/72.7 X |
| 4,944,372 | 7/1990 | Taig | 188/156 |

FOREIGN PATENT DOCUMENTS

| | | | |
|---|---|---|---|
| 0307208 | 3/1989 | European Pat. Off. | 188/72.7 |
| 2108224 | 5/1983 | United Kingdom | 188/72.7 |
| 2163225 | 2/1986 | United Kingdom | 188/72.7 |

*Primary Examiner*—Robert J. Oberleitner
*Assistant Examiner*—Kevin D. Rutherford
*Attorney, Agent, or Firm*—Larry J. Palguta; Leo H. McCormick, Jr.

[57] ABSTRACT

The ball and revolving plate (1) clamping device uses guide cavities each comprising a housing (7a) which determines a single position for the ball (3), and a ramp (7b) which is connected to the housing (7a) by way of a plurality of points of intersection (7c) situated on a slope discontinuity. This arrangement enables the clamping force to be optimized.

3 Claims, 2 Drawing Sheets

REVOLVING PLATE CLAMPING DEVICE

The present invention relates to a clamping device consisting of two substantially parallel plates of which one at least may be driven in rotational movement about an axis perpendicular to its surface, a plurality of guide cavities hollowed out in at least one of these plates at a distance from the axis and a plurality of corresponding balls inserted into the cavities and gripped between the two plates, each guide cavity forming a cam and providing a bearing surface rising monotonically, covering a non-nil angle of the rotational movement, from a portion of maximum depth to the surface of the plate.

Devices of this type are well known in the prior art and are used, for example, as shown in U.S. Pat. No. 3,638,763 for the clamping operation of hand brakes in motor vehicles.

A problem usually arising in these devices is how to obtain the highest possible clamping force for a relative rotation of the plates corresponding to the shortest possible displacement of the balls in the guide cavities, the load needed to obtain this rotation being limited to the lowest possible value.

To this end, it is known, for example from European Patent Application No. 0,209,271 how to intervene on the shape of the guide cavities and in particular how to decrease the slope of these cavities from their zone of maximum depth to the vicinity of the surface of the plate in which they are hollowed out.

However, besides the fact that the known devices may induce relatively important production problems, due to the optionally sophisticated shapes they adopt none of them totally optimizes the ratio between the travel and the operational load of the clamping device and the force generated by the latter.

The invention is based on the exposure of this fact, and proposes to lead to this optimization.

To this end, the device according to the invention is substantially characterized in that the portion of maximum depth of the guide cavity forms a housing for the corresponding ball, which holds it in a single determined position, and in that this cavity consists, in a portion of lesser depth, of a ramp which intercepts the housing in a plurality of points of intersection in the direct vicinity of which, on the one hand, the ball forms a first slope tangent with the housing, and in the vicinity of which points, on the other hand, the ramp has a second slope which is substantially shallower than the first slope, said points of intersection thus being situated on a slope discontinuity.

Thus, and contrary to known devices in which the variation of slope of the guide cavity intervenes only at a distance from the zone of maximum depth and/or only occurs in a continuous and gradual way from this zone, the device according to the invention enables all mechanical clearances to be adjusted from the beginning of its operation and results in a clamping force which is substantially greater than that allowed by known devices, for the same input force and the same travel.

Further characteristics and advantages of the invention will become clearly apparent from the description given below, by way of example and with no limitation being implied, with reference to the appended drawings, in which.

Figure 2:
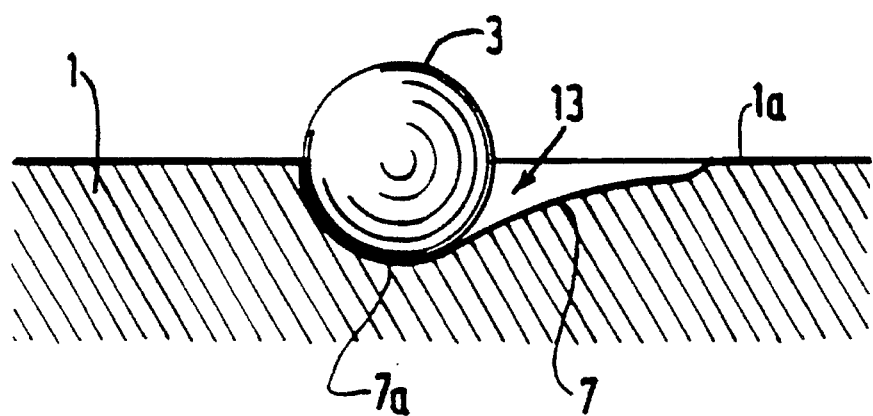
FIG. 2 is a schematic cross-sectional view of a revolving plate, of the corresponding ball, and of a guide cavity having a known contour, in which the ball is housed, the cross section being cut through the longitudinal axis of the cavity.
Figure 3:
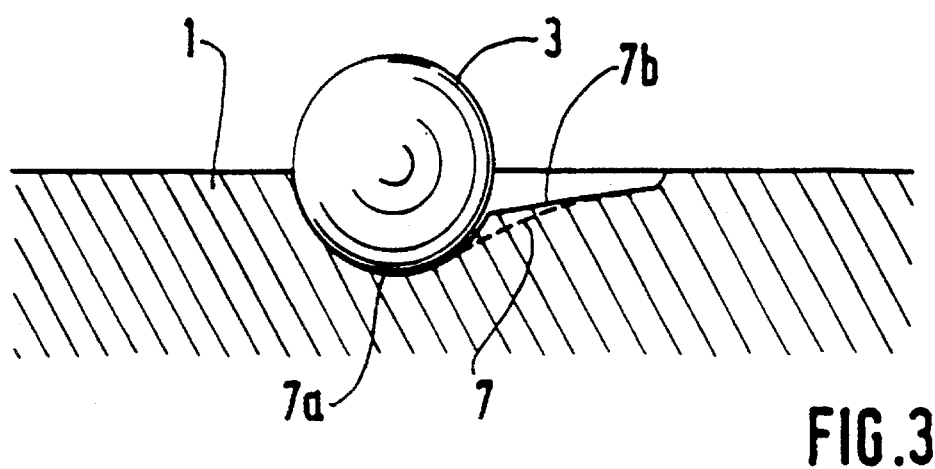

FIG. 3 superposes onto the contents of FIG. 2 the contour of a guide cavity according to the invention so as to explain the differences between the latter and the prior art.

Figure 4:
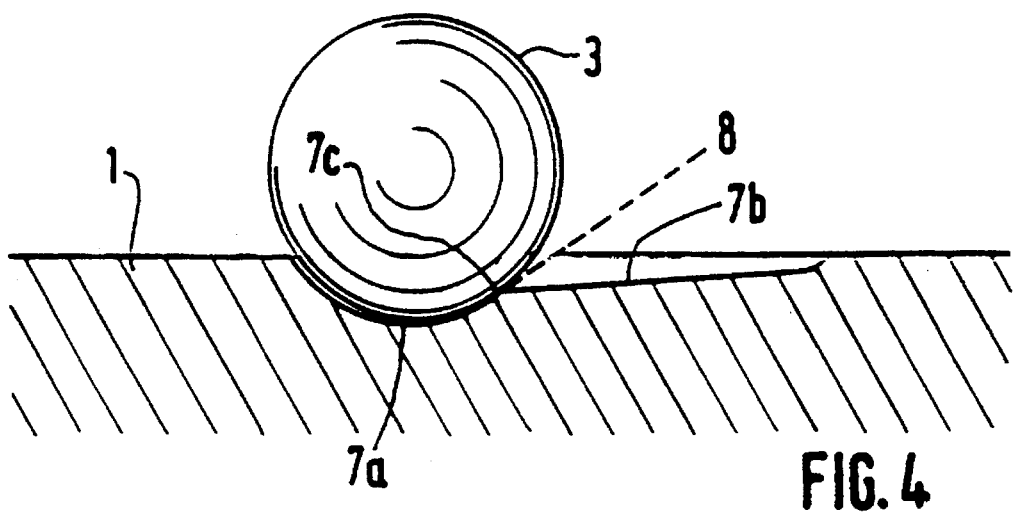
Figure 5:
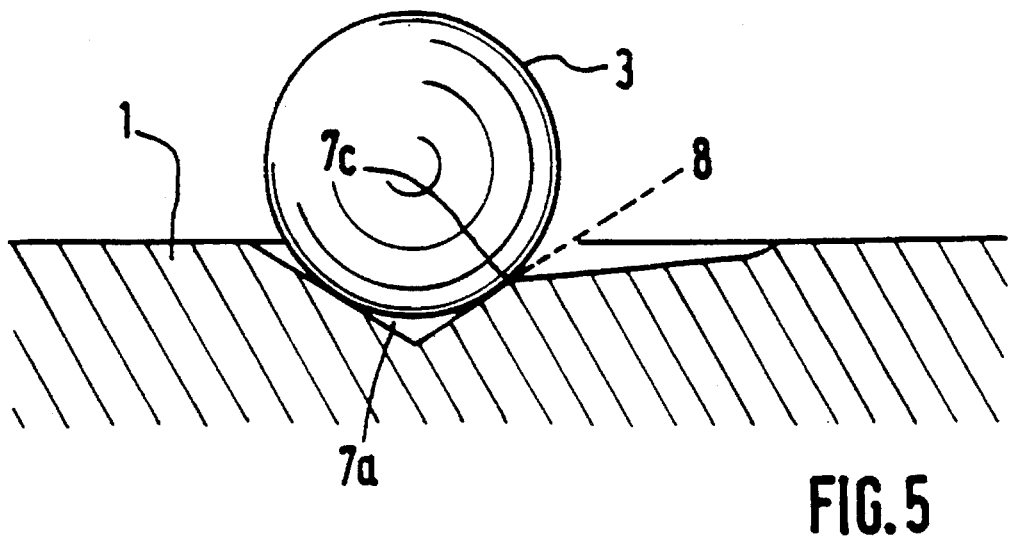

FIG. 4 is an enlarged and schematic cross-sectional view of a revolving plate, the corresponding ball and a guide cavity according to a first embodiment of the invention, the cross section being cut through the longitudinal axis of the ball; and FIG. 5 is a view similar to the one in FIG. 4, but relates to a second embodiment of the invention.

Figure 1:
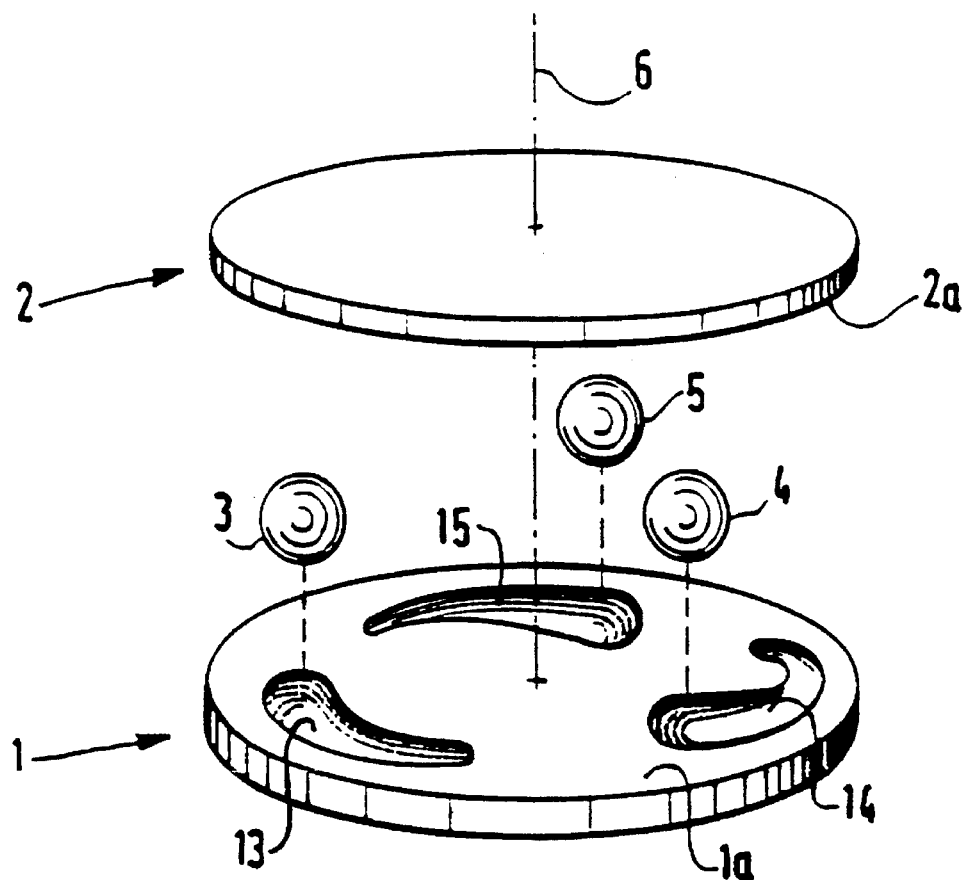
FIG. 1 is an exploded perspective view of a revolving plate clamping device.

FIG. 1 is a schematic representation of a revolving plate clamping device.

Such a device comprises first and second plates 1 and 2, substantially parallel to each other and gripping balls such as 3, 4 and 5 between their facing sides 1a and 2a (not visible).

These plates can be subjected to a relative rotation by rotational drive of at least one of them about an axis 6 perpendicular to its surface.

The balls 3, 4 and 5 are housed in identical guide cavities such as 13, 14, 15, hollowed out in the first plate 1 at least.

These cavities have an elongated shape and each has a longitudinal axis of generally circular shape centered on the axis of rotation 6. However, even when these cavities have a different shape or layout they always extend in the direction of their length, covering a non-nil angle of the rotational movement, so that such a movement makes the balls move forward inside the cavities.

As shown in FIG. 2, which illustrates an example of the prior art, each cavity such as 13 plays the role of a cam and provides the corresponding ball, such as 3, with a bearing surface 7, rising monotonically from a portion of maximum depth 7a to the surface 1a of the plate.

In other words, the bearing surface 7 always moves, from the zone 7a to the surface 1a of the plate, in the direction in which it tends to get closer to this surface, although this movement may be more or less rapid as shown in FIGS. 2 to 5.

In this way, when the plates 1 and 2 are subjected to a relative rotation from a position in which the balls rest in the portions of maximum depth such as 7a, and in the appropriate sense of rotation, the balls move inside the corresponding cavities, and push the plates 1 and 2 away from each other by applying opposed forces oriented in the direction of the axis 6 thereon.

According to the invention (FIG. 3 in solid line; FIGS. 4 and 5), the deepest portion 7a forms a housing for the corresponding ball 3, which holds it in a single determined position and the guide cavity consists, outside this housing, of a ramp 7b which intercepts the housing in a plurality of points of intersection such as 7c (FIGS. 4 and 5) in the vicinity of which, on the one hand, the ball in place in the housing 7a forms a tangent 8 with the latter, which tangent is oriented along a first slope and in the vicinity of which points, on the other hand, the ramp 7b has a second slope which is shallower than the first slope, the points of intersection such as 7c thus being situated on a slope discontinuity.

The previously expressed concept of steeper or shallower slope uses as a reference the slope of the surface 1a of the plate, considered as nil.

In other words, the slope of the ramp 7b is much closer to that of the surface 1a than that of the tangent 8, and the points such as 7c are located on a clear transition from one slope to the other.

FIG. 3, although schematic as are all the FIGS. 2 to 5, in that it exaggerates the depth of the guide cavity and of the housing 7a for the sake of clarity, makes it possible to understand the reasons why a clamping device according to the invention produces better results than those of the prior art.

In fact, since in the prior art (FIG. 3, dotted line), the slope of the bearing surface 7 of the cavity 13 develops in a continuous way, at least to a certain distance from the zone 7a of maximum depth, the slope of this bearing surface 7, at least to this distance, is necessarily greater than the slope of the ramp 7b of the device of the invention.

However, on the one hand, the shallower the slope of the bearing surface at the point at which the ball is located, the shallower the rotational load to be applied to overcome a determined clamping force which tends to bring the two plates closer together and, on the other hand, in the practical applications of the device of the invention, the deeper the point of the guide cavity on which the ball bears, the smaller the force which is opposed to the relative rotation of the plates due to the necessary levellings and clearance adjustments.

By adjusting all clearances for a position of the ball (that is to say that in which the ball bears on the points of intersection 7c) which is directly adjacent to that in which the ball is at the deepest point in the guide cavity, the device of the invention enables, for a guide cavity of a given length, the ratio between the clamping load produced by the device and the load needed to drive the plates in a relative rotation, to be increased.

As shown in FIGS. 4 and 5, the housing 7a does not necessarily have to adopt a determined particular shape.

It can thus in particular adopt the shape of a portion of a sphere with a radius greater than, but very similar to, that of the ball (FIG. 4), a conical shape (FIG. 5) or a frustoconical shape.

We claim:

1. Clamping device consisting of two substantially parallel plates of which one at least may be driven in rotational movement about an axis perpendicular to a surface of the one plate, a plurality of guide cavities hollowed out in said one plate at a distance from the axis and a plurality of corresponding balls inserted into the cavities and gripped between the two plates, each guide cavity forming a cam and providing a bearing surface rising monotonically, covering a non-nil angle of the rotational movement, from a portion of maximum depth to the surface of the plate, characterized in that the portion of maximum depth of the cavity forms a housing for the corresponding ball, which holds the ball in a single determined position, and in that the cavity consists in a portion of lesser depth of a ramp which intercepts the housing in a plurality of points of intersection in the direct vicinity of which the ball forms a first slope tangent with the housing and in the vicinity of which points the ramp has a second slope which is substantially shallower than the first slope, said points of intersection thus being situated on a slope discontinuity comprising an edge.

2. Clamping device according to claim 1, characterized in that the housing adopts the shape of a portion of a sphere with a radius similar to that of the ball.

3. Clamping device according to claim 1, characterized in that the shape of the housing is at least partially conical.

* * * * *